Nov. 16, 1965  J. L. DIAMOND ETAL  3,217,500
PLASTIC DRAIN PIPE APPARATUS FOR FORMING
AND LAYING PLASTIC DRAIN PIPE
Filed Aug. 29, 1961  4 Sheets-Sheet 3
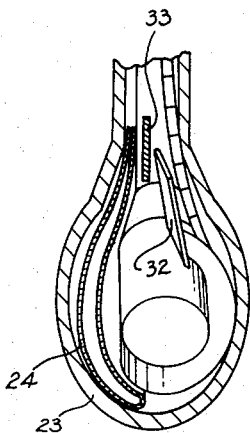
Fig-5-
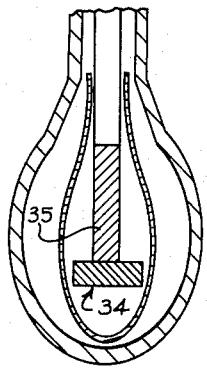
Fig-6-
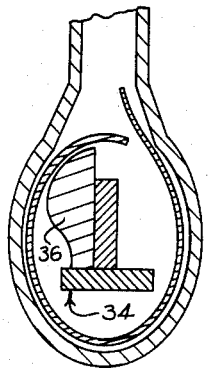
Fig-7-
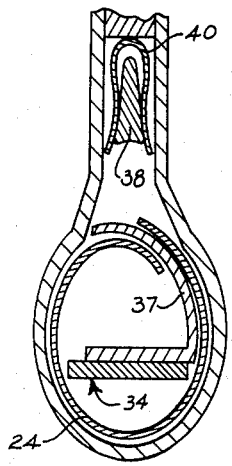
Fig-8-
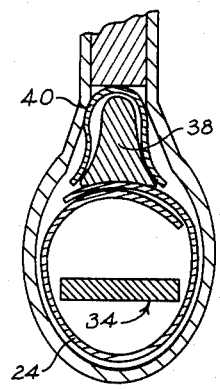
Fig-9-
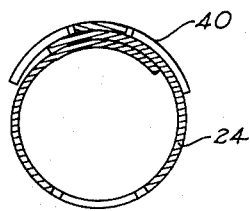
Fig-10-
INVENTORS.
JOHN L. DIAMOND
BY LESTER L. PIERCE
Fryer and Zimmvold
ATTORNEYS Nov. 16, 1965　　　　J. L. DIAMOND ETAL　　　　3,217,500
PLASTIC DRAIN PIPE APPARATUS FOR FORMING
AND LAYING PLASTIC DRAIN PIPE
Filed Aug. 29, 1961　　　　　　　　　　　　　4 Sheets-Sheet 4
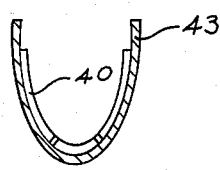
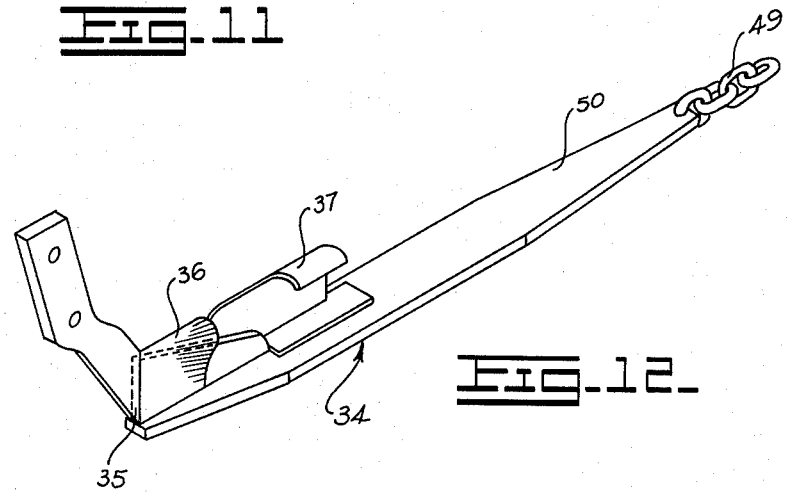
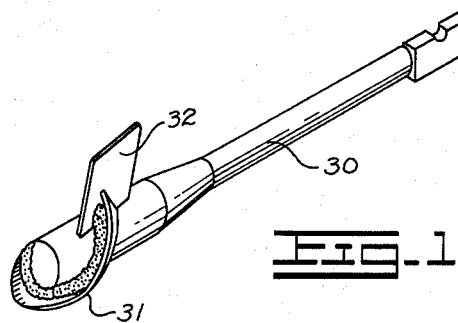
INVENTORS.
JOHN L. DIAMOND
BY LESTER L. PIERCE
ATTORNEYS United States Patent Office 3,217,500
Patented Nov. 16, 1965

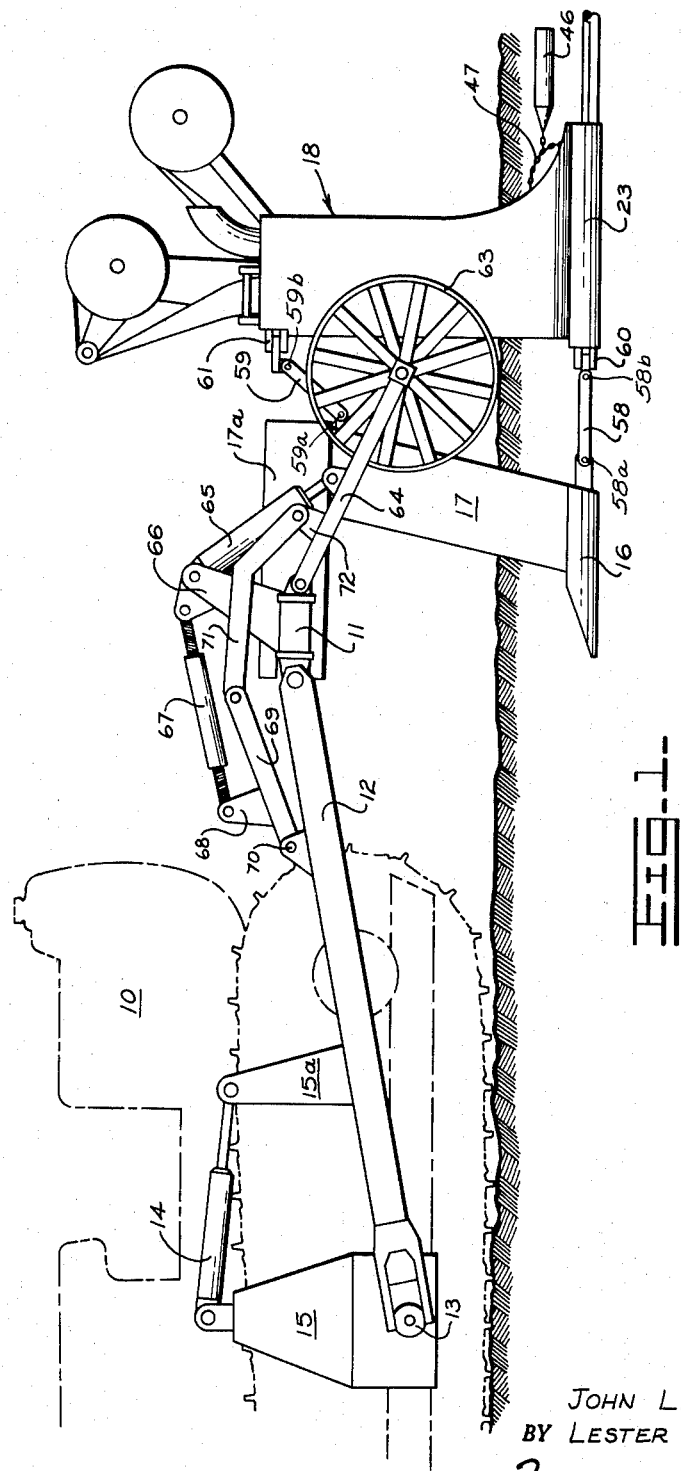

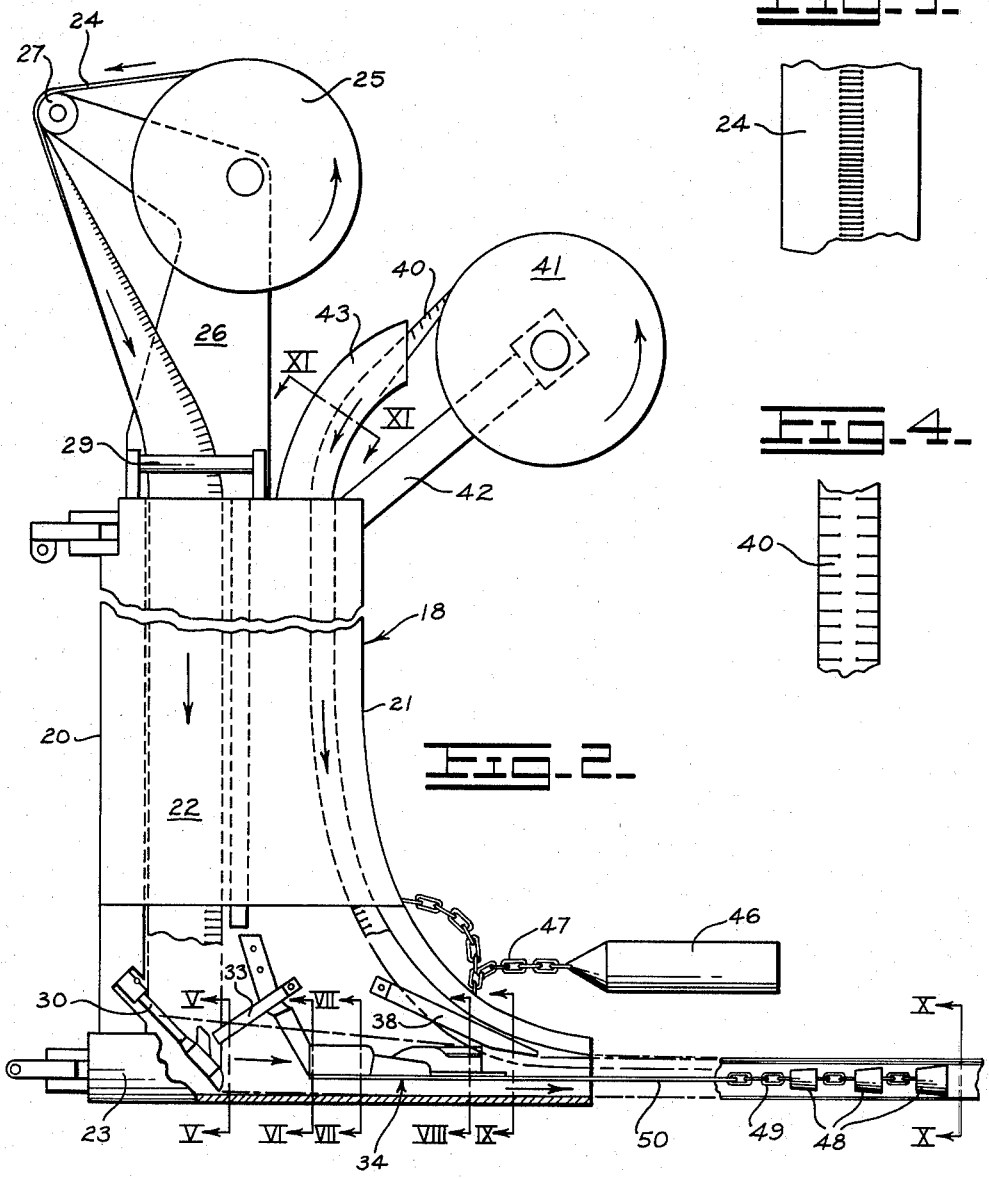

3,217,500
PLASTIC DRAIN PIPE APPARATUS FOR FORMING AND LAYING PLASTIC DRAIN PIPE
John L. Diamond, Peoria, Ill., and Lester L. Pierce, Abilene, Tex., assignors to Caterpillar Tractor Co., Peoria, Ill., a corporation of California
Filed Aug. 29, 1961, Ser. No. 134,613
2 Claims. (Cl. 61—72.5)

This invention relates to drain pipe of the kind which is laid underground for the disposal of subsurface water and to an apparatus for simultaneously forming and laying such pipe from a flat strip of pliable or plastic material.

Underground perforate pipe is commonly used to drain off superfluous subsurface water but it also has other uses such as subsurface irrigation and fertilization and the removal of salts which accumulate in the earth as the result of surface irrigation. The usual methods of laying commonly used drain pipes are economically prohibitive in many instances and considerable research has been directed toward the provision of a machine capable of laying a low cost pipe at relatively high speeds. This has been accomplished with a limited degree of success by a machine carrying a roll of plastic in flat web form capable of forming the web into a tube and releasing it in the wake of a subsoiler blade as it is drawn through the earth by a tractor. The plastic web has been formed into a tube as it leaves the machine and various means have been tried for securing it in tubular form. These means have proven unsatisfactory and it is one object of the invention to provide means for forming and laying a plastic tube beneath the surface of the ground in such a manner that securing means for holding it in tubular shape are unnecessary.

Other objects of the invention are to provide an inexpensive drain pipe and means for laying it in a rapid and continuous manner to the end that a strong well rounded and reinforced drain is provided and protected against crushing by heavy loads on the surface of the soil above it.

Further and more specific objects and advantages and the manner in which they are carried into practice will be made apparent in the following specification wherein reference is made to the accompanying drawings for a detailed description of the invention.

In the drawings:

FIG. 1 is a view in side elevation showing the apparatus of the present invention being drawn by a tractor, a portion of which is illustrated in broken lines;

FIG. 2 is an enlarged view in side elevation of that portion of the apparatus which forms and lays the plastic pipe of the present invention with parts broken away to disclose other pertinent parts of the mechanism;

FIG. 3 is a fragmentary view of a piece of the plastic tape or web employed for forming the main portion of the drain pipe of the present invention;

FIG. 4 is a similar view of a reinforcing and covering member simultaneously placed by the apparatus which forms the pipe;

FIGS. 5 to 9, inclusive, are enlarged sectional views taken on the lines V—V to IX—IX, inclusive, of FIG. 2 illustrating certain details of the pipe forming mechanism;

FIG. 10 is a view in end elevation of a pipe formed in accordance with the present invention showing the reinforcing cover member in place thereon in the relative positions assumed when the parts are disposed beneath the ground;

FIG. 11 is a sectional view taken on the line XI—XI of FIG. 2;

FIG. 12 is a perspective view of an assembly of the forming members shown in FIGS. 5 to 8, inclusive; and FIG. 13 is a perspective view on an enlarged scale of a member shown in FIG. 2 for causing the unformed web of plastic material to change directions as it approaches the forming member.

Referring first to FIG. 1 of the drawings, a tractor is partially illustrated in broken lines at 10 as drawing a conventional tool bar 11 at the ends of a pair of draft arms, one of which is shown at 12, pivotally secured to the sides of the tractor as at 13. This assembly may be raised and lowered by power means such as a hydraulic jack indicated at 14 disposed between a rigid tower 15 on the side of the tractor and an arm 15a secured to the draft arm 12. A similarly arranged jack, not shown, is disposed on the opposite side of the tractor. A subsoiler shank 17 is supported by a clevis 17a which is pivotally connected to the tool bar 11 in a well known manner to permit castering or trailing as it is drawn forwardly by the tractor. A pointed tip 16 on the subsoiler shank is of substantially cylindrical contour to form a cylindrical opening or burrow beneath the surface of the soil within which a tubular drain may be disposed. A tube forming and laying apparatus shown generally at 18 as being towed behind the subsoiler is illustrated in greater detail in FIG. 2.

This apparatus includes a vertically disposed housing having front and rear walls 20 and 21, respectively, and side walls, one of which is shown at 22. The bottom is closed by a substantially cylindrical sole plate 23 of about the same diameter as the subsoiler point 16 and is arranged to pass through the opening formed by the subsoiler tip 16 while the vertical housing directly above the sole plate passes through the loose broken ground created by the passage of the shank 17 of the subsoiler. A perforated plastic ribbon, a portion of which is shown at 24 in FIG. 3 as having perforations joined by slits to permit the passage of water through the wall of the tube formed by it, is carried on a spool 25 pivotally supported on a bracket 26 which extends upwardly from the top of the apparatus 18. The ribbon or web 24 extends over a guide roller 27 also supported on the bracket 26 and then passes downwardly and between a pair of folding rollers, one of which is shown at 29, and the function of which is to fold the web along its longitudinal center line so that it passes in double thickness downwardly through a suitable channel in the apparatus 18. A bar 30 adjacent the lower end of the apparatus is disposed at approximately a 45° angle and the folded web passes over this bar to change its direction of travel from vertical to horizontal. A spiral formation best shown at 31 in FIG. 13 is welded to the end of the bar and with a finger or guide member 32 assists in changing the course of the folded plastic web. The centrally disposed slits in the web shown in FIG. 3 facilitate changing its course and also provide openings for drainage purposes.

As the plastic leaves the bar 30, the rearward edge of the vertically moving portion and the top edge of the horizontally moving portion pass on opposite sides of a finger 33, a part of which is shown in section in FIG. 5 to prevent interference between the two portions. From this point, the folded plastic is formed into a tubular shape by a forming anvil generally shown at 34, see also FIG. 12, which starts with an inverted T-shaped configuration as at 35 (FIGS. 6 and 12) with a tapered enlargement 36 on one side as in FIGS. 7 and 12 and an overlapping former plate 37 as shown in FIGS. 8 and 12. By reference to FIGS. 6, 7 and 8, it is apparent that in passing over the forming anvil, the folded plastic of FIG. 5 is gradually separated and spread until the substantially tubular shape with overlapping upper edges shown in FIG. 8 is obtained. As the shaped web progresses rearwardly toward its point of exit from the rear end of the sole member 23, it passes beneath a forming iron 38, which as shown in section in FIG. 9 urges it further toward a true circular configuration.

Under some conditions, it is desirable to reinforce the overlapped upper portion of the tube because of heavy surface loading on the earth in which it is buried and this is accomplished in the present invention by the use of a second narrower reinforcing web shown at 40 in FIG. 4 which may also be suitably perforated and slit in the manner indicated and which is carried upon a spool 41 pivotally supported on a bracket 42. This web is threaded downwardly through a U-shaped guide 43 (see FIG. 11) and through the body of the device 18 to pass over the top of the iron 38 in the manner shown in FIG. 9 and then, in leaving the rear tubular end of the sole member 23, to be disposed directly on top of the tube formed of the web 24 as shown in FIG. 10.

It is desirable in order to retain the tubular form of the drain element without the necessity of fastening means and also to protect it against the crushing effect of heavy loads on the surface of the earth above it to compact the earth around it as it is being layed. This compaction is accomplished in the present invention by the provision of a torpedo-like element 46 shown in FIG. 1 as drawn behind the device by a chain 47. The draft chain is adjustable by changing the position of the links which connect it to the device so that the trailing position of the torpedo 46 may be adjusted vertically to a position where it effects the most desirable degree of compaction of the loose earth above the tube.

To insure against compression of the tube by the action of the compacting torpedo, a series of forming members of frusto-conical shape as shown at 48 in FIG. 2 is drawn by a chain 49 connected with an extension 50 of the forming member 34. These members are graduated in size for gradually spreading the tube outwardly into a cylindrical form in the event that it is compressed by the action of the torpedo 46 and for this reason they are disposed just rearwardly of the trailing end of the torpedo.

The apparatus 18 must be capable of being raised and lowered in the ground in order to maintain desired depth and pitch for drainage purposes. This raising and lowering, however, must be accomplished gradually to prevent shearing of the plastic tube as it is feed outwardly from the rear end of the sole member 23. The manner of raising and lowering the subsoiler shank 17 and point 16 will presently be described, and referring back to FIG. 1, the means for causing the element 18 and sole member 23 to follow the opening in the earth formed by the subsoiler 16 are shown as a lower, substantially horizontal pivoted link 58 and an upper angularly disposed pivoted link 59. With this arrangement and assuming that the subsoiler tip 16 is being gradually raised or lowered with respect to the surface of the ground, it is apparent that as the lower, or sole plate portion 23 of the member 18 follows the path of the subsoiler 16, the upper, angularly disposed link 59 swings an arcuate path, gradually changing the vertical position of the apparatus 18 with respect to the subsoiler shank. Thus, a slight angularity occurs between the subsoiler point 16 and sole member 23, producing a trailing effect and preventing abrupt vertical movement of the tail end of the sole member 23 which would tend to shear the plastic tube as it leaves the rear end of the sole member.

The links 58 and 59 are connected by swivel joints 60 and 61 to the forward edge of the apparatus 18 in order to permit angular movement thereof in a horizontal plane when the tractor is negotiating a turn.

In order to vary the depth of the subsoiler with respect to the surface of the ground and hold it at a desired depth, a pair of depth gauge wheels, one of which is shown at 63, is carried on pivoted arms 64 from the rear of the tool bar 11. A hydraulic jack 65 connects these arms with a tower 66 secured to the tool bar 11 so that upon extension or retraction of the jack, the tool bar and subsoiler carried by it are raised and lowered. The subsoiler 16 should travel substantially parallel to the surface of the ground in order to make a substantially circular opening for reception of the drain tubing to be laid, and any inclination from this parallel position would form a vertically elongated opening which is undesirable. Since its position is substantially parallel to that of the tool bar 11, it is desirable that the tool bar be maintained in substantially the same plane or substantially parallel to the surface of the ground at all levels of operation and during the transition of movement between one level and another.

The initial position of the tool bar 11 is established by a jack screw 67 which forms a connection between the tower 66 on the tool bar and a bracket 68 connected through a lever 69 and pivot point 70 with the draft arm 12. The lever 69 is also pivotally connected with a lever 71, having a pivotal connection with a bracket 72 on the arm 64 which supports the depth gauge wheels 63. As a result of this linkage, upward movement of the tool bar resulting from extension of the hydraulic jack 65 to raise the subsoiler is translated through the link 71, the link 69, and the jack screw 67 to maintain the tool bar substantially parallel to the ground and avoid the undesired angularity of the point 16 of the subsoiler which would otherwise take place as a result of altering the depth of its operation. The linkage between the tractor and subsoiler is capable of raising or lowering the subsoiler while maintaining the tip 16 thereof at a substantially constant angle with respect to the surface of the earth through the range of angularity which can be established by adjustment of the jack 67. Connections 58a, 58b, 59a and 59b have horizontal pivots to allow vertical movement of the associated links while connections 60 and 61 have vertical pivots to allow transverse horizontal movement of the tube forming apparatus with respect to the subsoiler tip and linkage. Referring to FIG. 1 of the drawings, raising of the subsoiler causes a clockwise movement of the tube forming apparatus as the inclination of link 59 causes rearward movement of joint 59b. This movement reduces stresses on the plastic tubing which would otherwise result from sudden movements of the subsoiler. As the subsoiler is lowered, the tube forming apparatus moves in a counterclockwise direction also tending to protect the plastic tubing from sudden stresses. This advantage could not be accomplished with a parallelogram linkage such as is often found as a connection for a trailing device.

We claim:

1. In combination with a tractor, a subsoiler drawn thereby and comprising a shank with a tip on its lower end movable through the earth parallel to the surface thereof, an apparatus drawn by the subsoiler including means for forming and laying a plastic tube in the void formed by the tip on the subsoiler, draft arms pivotally connected to the tractor to be raised and lowered, a pivotal connection between the subsoiler and the draft arms to enable adjustment of the angle of the tip with respect to the surface of the earth, means connected between the tractor and draft arms to raise and lower the draft arms to adjust the depth of the tip, and linkage means between the draft arms and subsoiler operable automatically upon raising or lowering the draft arms to move the subsoiler about its pivotal connection to maintain the tip parallel to the surface of the earth.

2. The combination of claim 1 including two nonparallel links pivotally connecting the subsoiler and apparatus drawn by it to cause the tube laying portion of the apparatus to follow the subsoiler in the void created by its tip.

(References on following page)

References Cited by the Examiner

UNITED STATES PATENTS

| | | | |
|---|---|---|---|
| 330,556 | 11/1885 | Briggs | 61—13 |
| 355,588 | 1/1887 | Christianson | 61—72.7 |
| 1,218,727 | 3/1917 | Watson | 61—72.2 |
| 1,398,815 | 11/1921 | Trusty et al. | 61—72.2 |
| 2,118,553 | 5/1938 | Garlinger | 61—72.6 |
| 2,501,062 | 3/1950 | LeTourneau | 61—72.6 |
| 2,738,745 | 3/1956 | Harpold | 61—72.1 |
| 2,763,991 | 9/1956 | Kennon | 61—13 |
| 3,037,357 | 6/1962 | Knapp et al. | 61—72.6 |
| 3,120,107 | 2/1964 | Juusela et al. | 61—72.6 |

FOREIGN PATENTS

| | | |
|---|---|---|
| 93,022 | 12/1959 | Holland. |
| 283,035 | 1/1928 | Great Britain. |

OTHER REFERENCES

Agricultural Engineering of February 1958, pp. 92 and 93.

Agricultural Engineering of November 1958, p. 712.

EARL J. WITMER, *Primary Examiner.*

JACOB L. NACKENOFF, JACOB SHAPIRO,
*Examiners.*